United States Patent
Grigaitis et al.

[11] Patent Number: 5,894,809
[45] Date of Patent: Apr. 20, 1999

[54] FUEL OVERFLOW PREVENTION DEVICE AND METHOD

[76] Inventors: Armin Grigaitis, P.O. Box 128, Honey Harbour, Ontario, Canada, P0E-1E0; Karl Berdan, P.O. Box 174, Midland, ONT, Canada, L4R 4K8

[21] Appl. No.: 08/868,308

[22] Filed: Jun. 3, 1997

[51] Int. Cl.[6] .................................................. B63B 8/00
[52] U.S. Cl. ........................ 114/343; 114/364; 141/86
[58] Field of Search .......................... 114/343; 141/86, 141/88, 98, 286; 220/86.1, 86.2

[56] References Cited

U.S. PATENT DOCUMENTS

| | | |
|---|---|---|
| 3,967,660 | 7/1976 | Russell . |
| 4,082,125 | 4/1978 | Wilson et al. . |
| 5,027,965 | 7/1991 | Dumars . |
| 5,070,806 | 12/1991 | Coster . |
| 5,322,099 | 6/1994 | Langlois .............................. 114/343 |
| 5,469,800 | 11/1995 | Brotz . |
| 5,503,199 | 4/1996 | Whitley et al. . |
| 5,507,324 | 4/1996 | Whitley et al. . |
| 5,662,149 | 9/1997 | Armellino ............................ 114/343 |
| 5,762,114 | 6/1998 | Petersen ............................... 114/343 |

*Primary Examiner*—Stephen Avila
*Attorney, Agent, or Firm*—Lorusso & Loud

[57] ABSTRACT

A device for preventing spillage of fuel during fueling of a boat or similar vessel includes a reservoir within the fuel system for collecting any overflowing fuel and returning such fuel to the boat's fuel tank. The reservoir is located intermediate the fuel tank vent tube through which the excess fuel is expelled. The reservoir collects the fuel while allowing air displaced in the fuel tank to escape. In a first embodiment, the reservoir surrounds the boat's fuel filler tube and the tube is perforated to allow fuel in the reservoir to enter. In a further embodiment, the reservoir is separated from the filler tube but is connected to the fuel line entering the fuel tank.

10 Claims, 4 Drawing Sheets ized with
5,894,809

1

FUEL OVERFLOW PREVENTION DEVICE AND METHOD

BACKGROUND OF THE INVENTION

1. Field of the Invention

The present invention relates to devices which control or prevent the spillage of fuel during fueling of nautical vessels and methods therefor.

2. Description of the Prior Art

During the fueling of pleasure boats, spillage of the fuel due to overfilling is common. Spillage of this sort occurs when, after the fuel tank reached capacity, excess fuel backs up through the filler tube (which connects the intake port to the fuel tank) or the vent tube (which provides venting for the fuel tank) and spills over onto the deck of the boat. Spillage can also occur due to turbulence in the water. Such spillage of toxic and highly flammable fluids results in environmental damage and poses a safety hazard to those on and off the boat.

Various devices have been proposed to prevent spillage of boat fuel. Examples of such devices are described in the following U.S. Pat. Nos.: 4,082,125; 5,027,965; 5,070,806; and 5,469,800. These references teach collection devices which include chambers to collect fuel that would otherwise spill over through the filler or vent tubes of boats. Once the fuel is collected by these devices, it remains in the chamber until manually emptied or disposed of.

In U.S. Pat. No. 3,967,660, there is taught an overflow control device which is used during the fueling process as a funnel. This device consists of a clear plastic chamber through which one can observe any overflowing fuel and allow same to drain back into the fuel tank. This device is not permanently attached to the boat and cannot be removed until completely drained. In U.S. Pat. No. 5,503,199, a fuel filler cap is taught which includes a baffle for preventing overfilled fuel from spilling through the vent tube. No means of collecting the fuel is provided in this device.

Thus, none of the prior art devices provide an efficient means of collecting excess fuel and returning same to the fuel tank.

SUMMARY OF THE INVENTION

Thus, a need exists for an efficient fuel collection device which overcomes the inadequacies of the prior art devices.

Accordingly, a preferred embodiment of the present invention provides a fuel overflow device for a boat having a fuel inlet, a vent port and an internal fuel tank having an entry port and an outlet port, and a fuel conduit connecting the fuel tank entry port to the fuel inlet, the device comprising:

a means, connected to the fuel tank, for collecting excess fuel overflowing from the fuel tank, the means including:

a means for returning the collected fuel to the fuel tank; and a means for connecting the fuel tank outlet port to the boat vent port through the means for collecting excess fuel.

The invention also provides a method of preventing the spillage of fuel during filling of a fuel tank of a boat, the method comprising:

collecting, within a reservoir, any fuel in excess of the fuel tank capacity; and allowing fuel collected in the reservoir to enter into the fuel tank as the fuel in the tank is depleted.

2

BRIEF DESCRIPTION OF THE DRAWINGS

These and other features of the preferred embodiments of the invention will become more apparent in the following detailed description in which reference is made to the appended drawings wherein like elements are indicated with like numerals and wherein.

DESCRIPTION OF THE PREFERRED EMBODIMENTS

Figure 1:
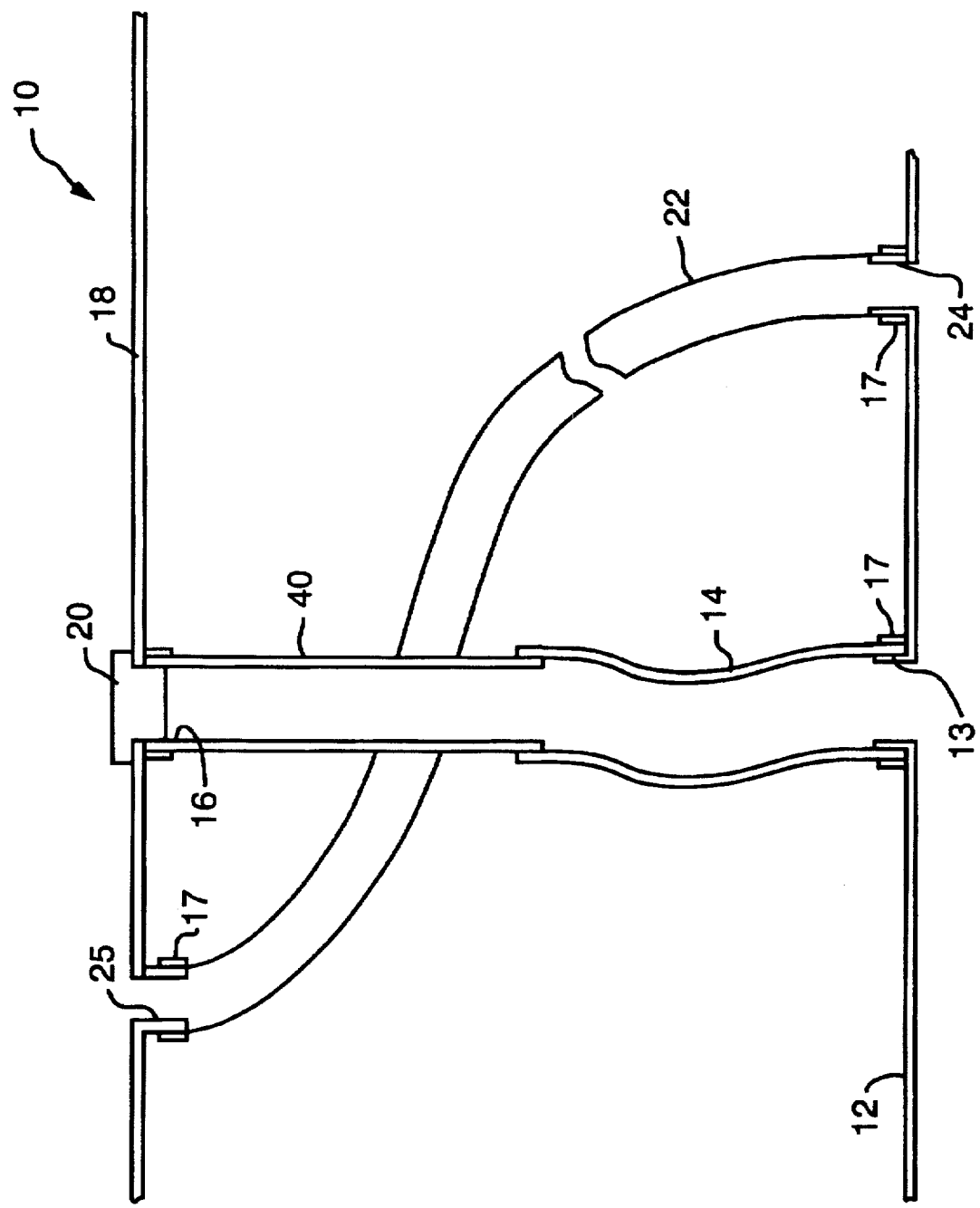
FIG. 1 is a side cross sectional view of a known fuel system.

Referring to FIG. 1, a boat 10 traditionally includes a fuel tank 12 and a fuel line 14, which connects a fuel entry port 13 of the fuel tank 12 to the fuel filler tube 40 which, in turn, is connected to the fuel inlet 16 fastened to the boat's deck or hull surface 18. Fuel inlet 16 is covered by a filler cap 20 which is removed during the fueling process. Also connected to the fuel tank 12 is an over-spill or vent tube 22 which connects to a fuel exit port 24 and vents air and excess fuel to the outside of the boat through an air vent 25. The various tubes are secured to the respective ports by usual means such as pressure collars 17.

Figure 2:
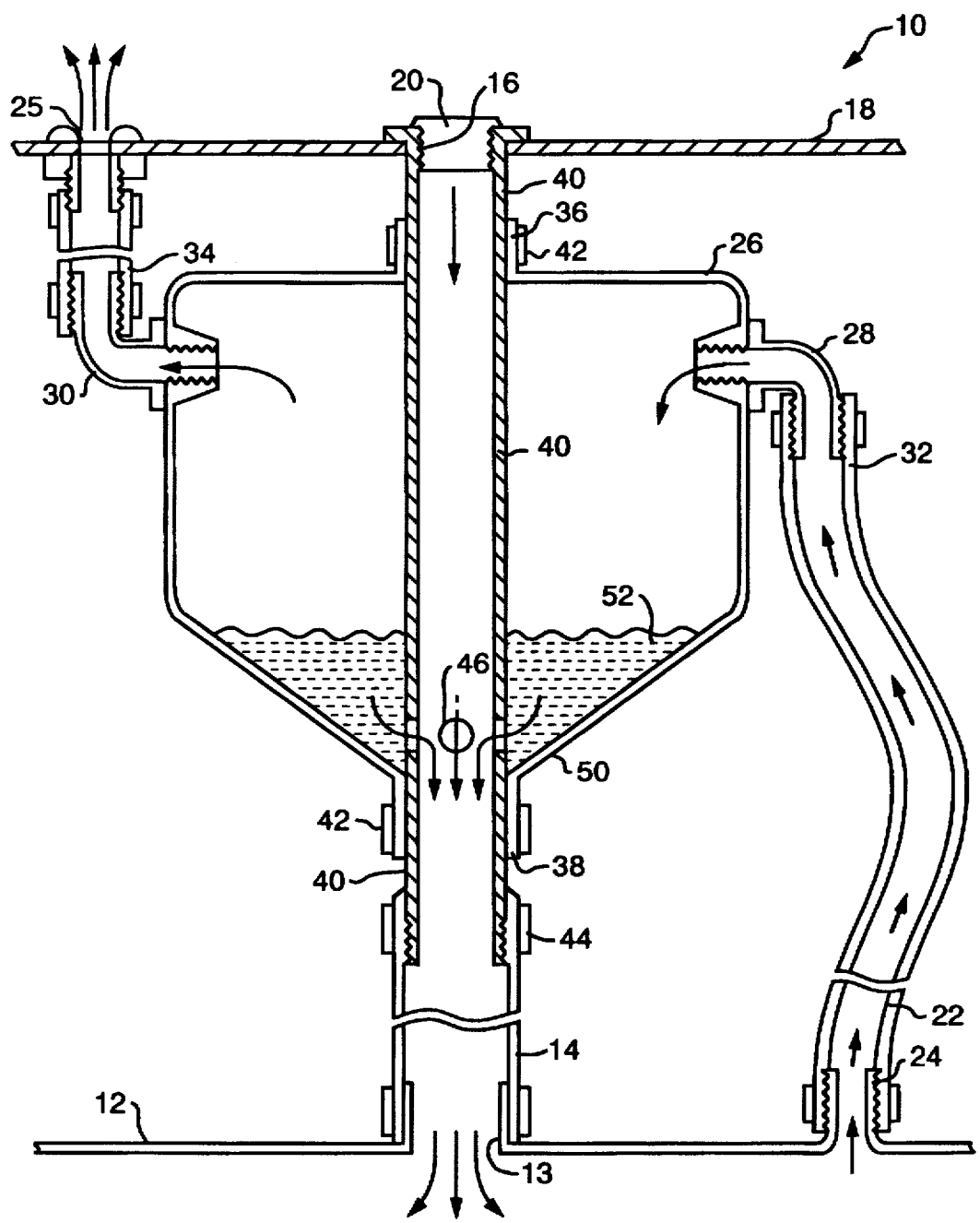
FIG. 2 is a side cross sectional view of an embodiment of the invention.

According to a preferred embodiment of the invention, as illustrated in FIG. 2, a fuel reservoir 26 is provided in the boat fuel system interrupting vent tube 22 and integrated with the fuel filler tube 40. The reservoir 26 has an inlet port 28 and an air vent port 30. The inlet port 28 is connected to the distal end 32 of vent tube 22. To the vent port 30 of the reservoir 26 is attached a second vent tube 34 which vents air from the fuel tank 12 and reservoir 26 to the atmosphere through the air vent 25. In the preferred embodiment, the reservoir includes top and bottom openings, 36 and 38 respectively, which permits the fuel filler tube 40 to extend through the reservoir 26. The reservoir is secured to the filler tube 40 by means of pressure collars 42. The fuel filler tube 40, as mentioned above, connects the fuel line 14 to the fuel inlet 16. The fuel line 14 is secured to the fuel filler tube 40 by usual means such as a pressure collar 44. In the preferred embodiment of the invention, the fuel filler tube 40 includes weep holes 46 located approximately near the base 50 of the reservoir 26 in such a manner as to allow collected fuel 52 inside the reservoir 26 to enter into the fuel filler tube 40 and thereby be returned to the fuel tank 12.

In fueling a boat including the integrated reservoir of the preferred embodiment, the following process takes place. Firstly, the fuel filler cap 20 is removed and fuel is introduced into the fuel filler tube 40 and fills the fuel tank 12. When the fuel tank is full, any excess fuel passes through either the vent tube 22 or backs up through filler tube 40 and enters the reservoir 26. Fuel 52 collected in the reservoir 26 is allowed to pass through weep holes 46 and enter into the fuel filler tube 40 and thereby into the fuel tank 12 as the volume of fuel in the tank 12 is exhausted.

In order to prevent spillage of fuel when fueling a boat, the following method is followed in accordance with a preferred embodiment of the invention. The fuel filler tube of the boat is perforated at an appropriate location and a reservoir as described above is passed around the filler tube and secured thereto. The air vent tube is severed and the free ends are attached to the respective ports on the reservoir.

Figure 3:
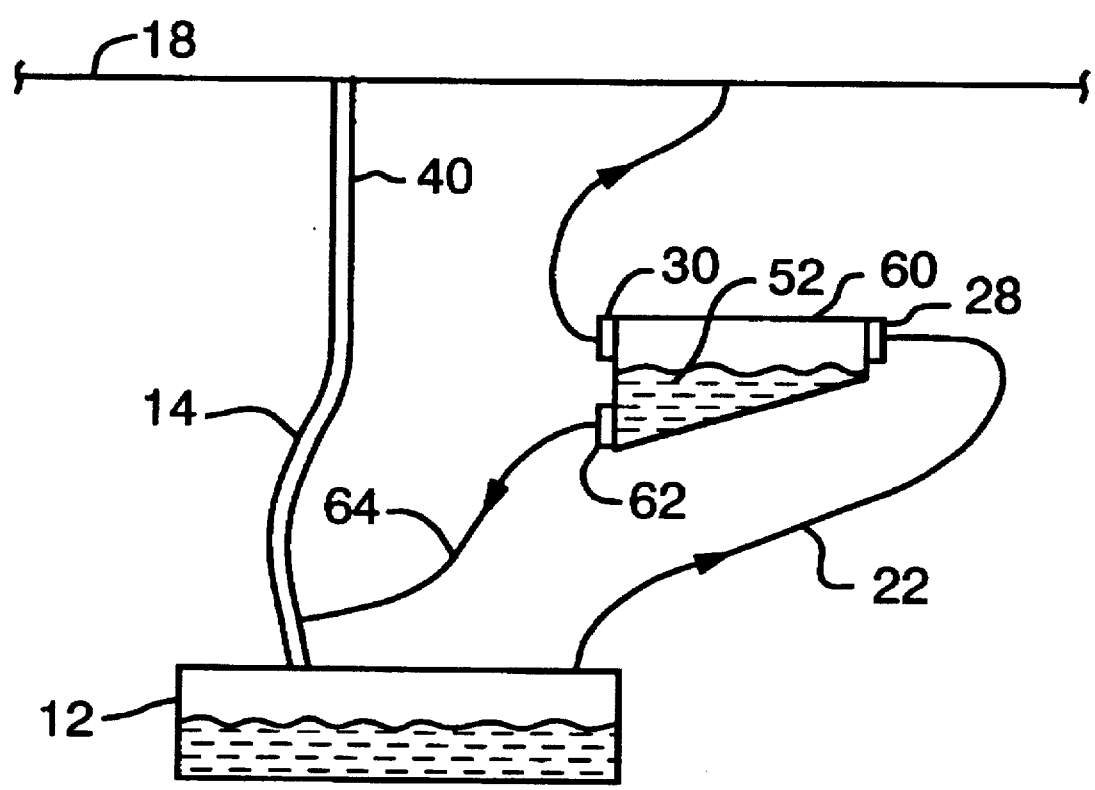
FIG. 3 is a schematic view of another embodiment of the invention.

Another embodiment of the invention is illustrated in FIG. 3 wherein the reservoir is not integrated with the fuel filler tube 40. In this embodiment, the reservoir 60 includes a further, fuel outlet port 62 to which is connected a fuel return line 64 to return collected fuel 52 from the reservoir 60 to the fuel tank 12 through the fuel line 14. As with the previous embodiment, the reservoir 60 includes an inlet port 28 and a vent port 30. The reservoir of this embodiment can therefore be located away from the fuel line 14 and no modification to the filler tube 40 is required.

The following events occur when fueling a boat having a separated reservoir as in the second embodiment of the invention as recited above. Fuel is added as before with the exception that the collected fuel 52 in the reservoir 60 is delivered directly into the fuel line 14, instead of the filler tube 40, and thereby into the fuel tank 12. In a further embodiment, the fuel return line 64 can be connected directly to the fuel tank 12 via a fuel tank port (not shown). In yet another embodiment, a pump may be used to transfer fuel from the reservoir to the fuel tank in cases where gravity flow of fuel is not possible.

A method of preventing fuel spillage according to this further embodiment of the invention involves securing a reservoir, as described above, to the boat. The fuel outlet port is connected to the fuel line or fuel tank by means of a tube. The air vent tube is severed and the free ends are connected to the respective ports on the reservoir. It will be appreciated that, in order for the fuel from the reservoir to flow by gravity into the fuel line, the reservoir should be maintained at a higher location than the fuel tank. In the alternative, a pump may be used to pump fuel into the fuel tank.

Figure 4:
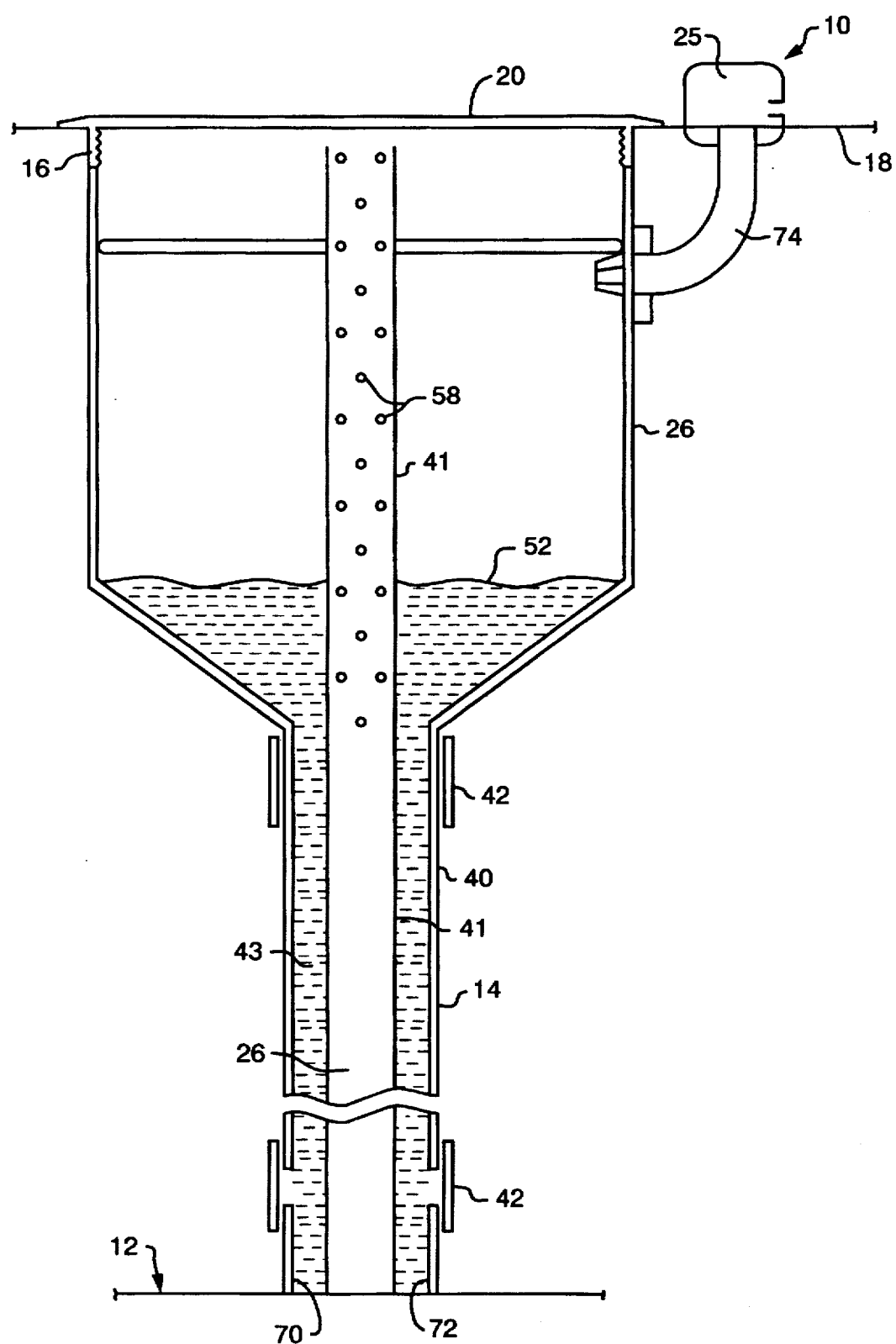
FIG. 4 is a side cross sectional view of another embodiment of the invention

A further embodiment of the invention is illustrated in FIG. 4 where a fuel tank does not have a separate vent port. In this embodiment, the fuel filler tube 40 is associated with an inner fuel tube 41 of a lesser diameter than tube 40, thereby creating a space 43 between the tubes. Inner fuel tube 41 has a lumen 66 and includes weep holes 68. Both fuel tube 40 and inner fuel tube 41 open into the fuel tank 12 and have openings 70 and 72, respectively. A reservoir 26 is attached to the fuel filler tube 40 and connects the tube 40 with the fuel inlet 16. A fuel filler cap 20 is provided to cover the fuel inlet when necessary. A vent tube 74 connects the reservoir 26 to the air vent 25. The fuel filler tube 40, the fuel entry port 70 and the reservoir 26 are all secured and connected by pressure collars 42 which are commonly used in such applications.

During the fueling process using the embodiment of FIG. 4, the fuel filler cap 20 is removed and fuel is introduced into the reservoir 26. The fuel travels into the fuel tank via the space 43 between the fuel filler tube 40 and the inner fuel tube 41. Air displaced by the entering fuel is vented via the lumen 66 of the inner fuel tube 41 and exits through holes 68 and is vented into the atmosphere. Once the fuel tank reaches its maximum capacity, any additional fuel backs up into the reservoir 26 where it is noticeable to the person filling the tank and provides sufficient time for such person to cease the filling process before any spillage occurs. The reservoir vent tube 74 allows any required venting of the system after the cap 20 is secured.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A fuel overflow device for a boat having a fuel inlet, a vent port and an internal fuel tank having an entry port and an outlet port, and a fuel conduit connecting said fuel tank entry port to said fuel inlet, said device comprising:

a means, connected to said fuel tank, for collecting excess fuel overflowing from said fuel tank, said means including:

a means for returning said collected fuel to said fuel tank; and a means for connecting said fuel tank outlet port to said boat vent port through said means for collecting excess fuel.

2. A device as claimed in claim 1 wherein said means for collecting excess fuel comprises a reservoir.

3. A device as claimed in claim 2 wherein said reservoir includes inlet and outlet ports wherein said reservoir inlet port is connected to said fuel tank outlet port and said reservoir outlet port is connected to said boat vent port.

4. A device as claimed in claim 3 wherein said reservoir is attached to said fuel conduit.

5. A device as claimed in claim 4 wherein said conduit extends through said reservoir.

6. A device as claimed in claim 5 wherein said means for returning collected fuel comprises openings in said fuel conduit to enable fuel from said reservoir to enter said conduit.

7. A device as claimed in claim 3 wherein said reservoir is connected to said boat and wherein said means for returning collected fuel comprises a fuel outlet on said reservoir and wherein said reservoir fuel outlet communicates with said fuel conduit.

8. A device as claimed in claim 2 wherein said fuel tank entry port and outlet port comprise one opening in said fuel tank.

9. A device as claimed in claim 8 wherein said reservoir includes inlet and outlet ports and wherein said reservoir inlet port is connected to said boat fuel inlet and said reservoir outlet port is connected to said boat vent port.

10. A fuel overflow device for a boat having a fuel inlet, a vent port, an internal fuel tank and a fuel conduit connecting said fuel tank entry port to said fuel inlet, said fuel tank having an entry port and an outlet port, said device comprising:

a reservoir having a fuel inlet, a fuel outlet and a vent port;

a first conduit connecting said fuel tank outlet port to said reservoir fuel inlet whereby excess fuel overflowing from said fuel tank is collected in said reservoir;

a passage from said reservoir fuel outlet to said fuel tank entry port whereby said excess fuel is returned to said fuel tank; and a second conduit connecting said reservoir vent port to said boat vent port whereby fumes from said reservoir are vented.

* * * * *